United States Patent [19]

Strachan

[11] Patent Number: 4,689,992

[45] Date of Patent: Sep. 1, 1987

[54] ROTATION RATE SENSOR

[75] Inventor: John S. Strachan, Edinburgh, Scotland

[73] Assignee: Syrinx Innovations Limited, Edinburgh, Scotland

[21] Appl. No.: 809,889

[22] PCT Filed: Apr. 1, 1985

[86] PCT No.: PCT/GB85/00131

§ 371 Date: Dec. 4, 1985

§ 102(e) Date: Dec. 4, 1985

[87] PCT Pub. No.: WO85/04722

PCT Pub. Date: Oct. 24, 1985

[30] Foreign Application Priority Data

Apr. 4, 1984 [GB] United Kingdom ............... 8408659

[51] Int. Cl.⁴ ..................... G01P 9/04; H01L 41/08
[52] U.S. Cl. ................... 73/505; 73/517 R; 73/DIG. 4; 310/329; 310/332; 310/333; 310/800
[58] Field of Search ............ 73/505, 517 A, 517 AV, 73/517 R, DIG. 4; 310/329, 331, 332, 333, 800

[56] References Cited

U.S. PATENT DOCUMENTS

| 3,219,850 | 11/1965 | Langevin | 310/333 |
| 3,520,195 | 7/1970 | Tehon | 73/505 |
| 3,903,733 | 9/1975 | Murayama et al. | 73/DIG. 4 |
| 3,971,250 | 7/1976 | Taylor | 73/DIG. 4 |
| 4,489,609 | 12/1984 | Burdess et al. | 73/505 |

FOREIGN PATENT DOCUMENTS 2117115 10/1983 United Kingdom ............ 73/517 R

Primary Examiner—John Chapman
Attorney, Agent, or Firm—Murray and Whisenhunt

[57] ABSTRACT

The sensor has two sheets (18, 20) of polarized polymeric piezoelectric material secured together with their main uniaxial mode aligned with axis (16). These are connected to an electric oscillator to induce mechanical oscillation of the assembly (10). A third sheet (22) of like material is secured to the sheets (18, 20) but has its main uniaxial mode transverse to the axis (16). Twisting of the assembly due to rotation causes substantial alteration of the voltage induced in the third sheet (22), the voltage being proportional to the rate of rotation.

5 Claims, 3 Drawing Figures

ROTATION RATE SENSOR

DESCRIPTION

This invention relates to a device for sensing acceleration, particularly rate of rotation, and to apparatus incorporating such devices.

It is of course well known to sense rotational acceleration by means of a gyroscope, and to provide inertial platforms and the like by a plurality of gyroscopes rotating about different axes. Such apparatus is extremely accurate but is also expensive.

An object of the present invention is to provide a simple and inexpensive rate sensor which has sufficient accuracy for certain applications.

The invention accordingly provides a device for measuring rotation, comprising a laminar assembly and means mounting said assembly so as to lie, in a rest condition, in a reference plane containing a central longitudinal axis; said assembly comprising a first piezoelectric member connected to an oscillator to produce oscillation of said assembly transverse to said reference plane, and a second piezoelectric member arranged to generate an electrical output when stressed in a direction oblique to said oscillation, said second piezoelectric member comprising two polarized polymeric piezoelectric films arranged in a common plane along said axis each with its main uniaxial mode transverse to said axis, and connected together in series; whereby said electrical output is a function of twisting of said assembly about said axis.

In a preferred form, said first piezoelectric member comprises two sheets of polarized polymeric piezoelectric material secured to and insulated from each other and having their main uniaxial mode aligned with said longitudinal axis, said two sheets being oppositely connected to said oscillator. The second piezoelectric member suitably comprises a further sheet of like material having its main uniaxial mode transverse to said longitudinal axis. The material may suitably by polyvinylidene fluoride (PVDF). A suitable form of this material is sold as KYNAR (Trade Mark) film by Pennwalt Corporation, King of Prussia, Pa. 19406, USA.

From another aspect, the invention provides apparatus including a plurality of devices as defined above arranged with their said longitudinal axes mutually perpendicular, whereby movement of the apparatus in a two-dimensional plane or in three-dimensional space may be measured.

An embodiment of the invention will now be described, by way of example, with reference to the accompanying drawings, in which.

The device comprises a sheet laminate 10 clamped at its top and bottom edges by parts 12,14 of a rigid housing (the remainder of which is not shown) such that in its rest position the laminate 10 lies in a reference plane having a longitudinal axis designated at 16.

Figure 1:
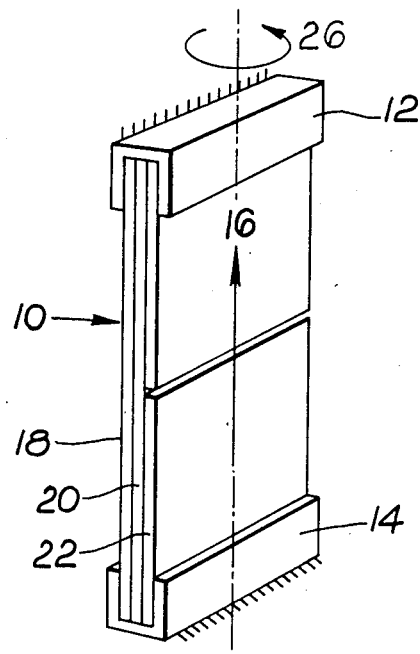
FIG. 1 is a schematic perspective view of a device embodying the invention.
Figure 2:
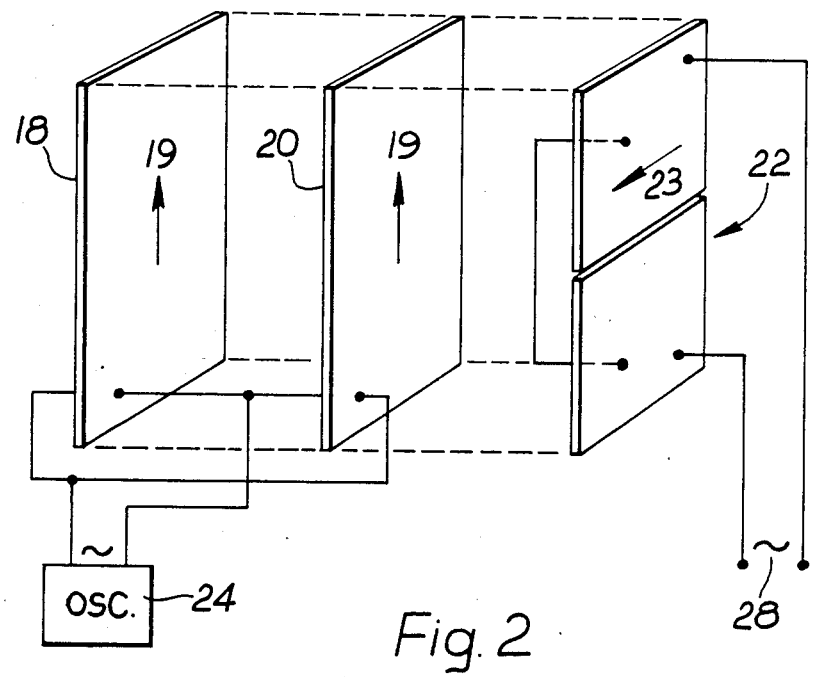
FIG. 2 is an exploded schematic view of part of the device of FIG. 1.

As shown more clearly in FIG. 2, the laminate 10 consists of three sheets 18,20,22 bonded together. Each of these sheets is of polarised PVDF film. The first and second sheets 18 and 20 have the main uniaxial mode 19 of the film aligned with the axis 16, while the third sheet 22 has its main uniaxial mode 23 at right angles to the axis 16. The three sheets 18,20,22 are bonded together by any suitable insulating adhesive.

The first and second sheets 18 and 20 are oppositely connected to an oscillator 24. The applied electric signal thus causes one sheet to lengthen while the other contracts and vice versa, and the laminate oscillates transverse to the axis 16. The oscillator 24 suitably oscillates at the resonant frequency of the mechanical system. In this mode of operation the third sheet 22 experiences stress in a direction normal to its main uniaxial mode, and the voltage induced therein is small (a few millivolts). However, if the housing is rotated about the axis 16, as indicated by arrow 26, the oscillating laminate has an inertia which tends to resist movement out of its initial position; this results in twisting of the laminate 10, the top and bottom edges moving with the housing but the central area lagging. Such twisting stresses the third sheet 22 in a direction oblique to the axis 16 and therefore more in alignment with its main uniaxial mode. The sheet 22 thus produces a much higher output voltage in the range of 10–20 V. The voltage produced is proportional to the rate of rotation. However, since the upper and lower parts of the third sheet 22 are twisted in equal and opposite directions, they produce equal and opposite voltages; the third sheet 22 is therefore composed of two separate halves connected as shown to give an output at 28.

Instead of using a PVDF bimorph as the oscillating element, some other planar oscillating element could be used, such as a metal plate driven by a ceramic transducer.

Figure 3:
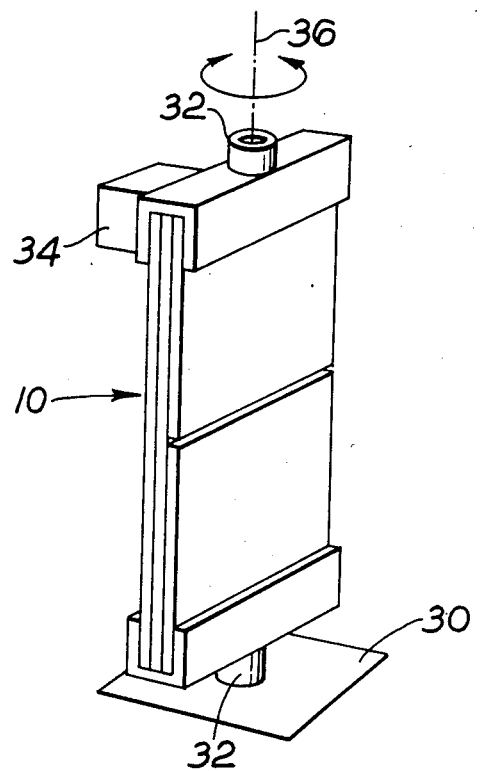
FIG. 3 illustrates a modification.

The device described may be modified to give an output signal which is a function of linear acceleration. This requires linear acceleration to produce twisting of the laminate while isolating the laminate from rotational movement. This may be accomplished as shown in FIG. 3 by rotatably mounting the laminate 10 within an outer body 30 on bearings 32, and mounting a mass 34 on the laminate eccentric to the rotation axis 36. Thus linear acceleration at right angles to the rotation axis 36 acts on the eccentric mass 34 to cause the laminate 10 to rotate, and the inertia of the laminate induces twisting thereof.

By mounting a number of the above devices about different axes in a platform, the resulting output signals representing rotation and/or linear acceleration can be processed to define movement of the platform in a 2-dimensional plane or in 3-dimensional space.

It is believed that the device of the present invention would allow bias stability of about 1°/minute to be achieved. This is not sufficiently accurate for applications such as navigation. It is envisaged, however, that it will be suitable for small-scale applications such as the positioning of movable machinery especially where the part in question is returned periodically (in a time scale of a few minutes) to a fixed datum position.

I claim:

1. A device for measuring rotation, comprising a laminar assembly and means mounting said assembly so as to lie, in a rest condition, in a reference plane containing a central longitudinal axis; said assembly comprising a first piezoelectric member connected to an oscillator to produce oscillation of said assembly transvorco to said reference plane, and a second piezo electric member arranged to generate an electrical output when stressed in a direction oblique to said oscillation, said second piezoelectric member comprising two polarized polymeric piezoelectric films arranged in a common plane along said axis each with a main uniaxial mode transverse to said axis, and connected together in series; whereby said electrical output is a function of twisting of said assembly about said axis and between said films.

2. The device of claim 1, in which said first piezoelectric member comprises two sheets of polarized polymeric piezoelectric material secured to an insulated from each other and each having a main uniaxial mode aligned with said longitudinal axis, said two sheets being oppositely connected to the oscillator.

3. The device of claim 2 or claim 1, in which said polarized polymeric piezoelectric material is polyvinylidene fluoride.

4. A device according to claim 1 for use as a rotation rate sensor, said laminar assembly being secured at opposed ends thereof to a body whereby said electrical output is a function of rotational speed of the body about said longitudinal axis.

5. Apparatus comprising a plurality of devices according to claim 1 arranged with their longitudinal axes mutually perpendicular, whereby movement of the apparatus in a two-dimensional plane or in three-dimensional space may be measured.

* * * * *